United States Patent
Armstrong, II

(10) Patent No.: US 9,929,572 B2
(45) Date of Patent: Mar. 27, 2018

(54) BATTERY CELL CHARGE MANAGEMENT SYSTEM AND METHOD

(71) Applicant: Gene Lee Armstrong, II, Richardson, TX (US)

(72) Inventor: Gene Lee Armstrong, II, Richardson, TX (US)

(73) Assignee: Gene Lee Armstrong, II, Richardson, TX (US)

(*) Notice: Subject to any disclaimer, the term of this patent is extended or adjusted under 35 U.S.C. 154(b) by 83 days.

(21) Appl. No.: 14/826,200

(22) Filed: Aug. 14, 2015

(65) Prior Publication Data

US 2016/0049810 A1 Feb. 18, 2016

Related U.S. Application Data

(60) Provisional application No. 62/037,382, filed on Aug. 14, 2014.

(51) Int. Cl.
*H02J 7/00* (2006.01)

(52) U.S. Cl.
CPC .......... *H02J 7/0014* (2013.01); *H02J 7/0021* (2013.01)

(58) Field of Classification Search
USPC .................................. 320/103, 116, 118
See application file for complete search history.

(56) References Cited

U.S. PATENT DOCUMENTS

| | | | |
|---|---|---|---|
| 2007/0126399 A1* | 6/2007 | Benckenstein, Jr. | H02J 7/0016 320/119 |
| 2009/0067200 A1* | 3/2009 | Bolz | H02J 7/0014 363/17 |
| 2014/0145669 A1* | 5/2014 | Wortham | H01M 10/4207 320/103 |

* cited by examiner

*Primary Examiner* — Brian Ngo

(57) ABSTRACT

A system and method for cell charging and cell charge redistribution for a plurality of series connected rechargeable electrical energy storage cells where the objective of charging and redistribution of charge for individual cells is based on the optimization criteria of equalization of remaining coulombmetric capacity for all cells.

2 Claims, 17 Drawing Sheets

Figure 7. Parallel System Detail

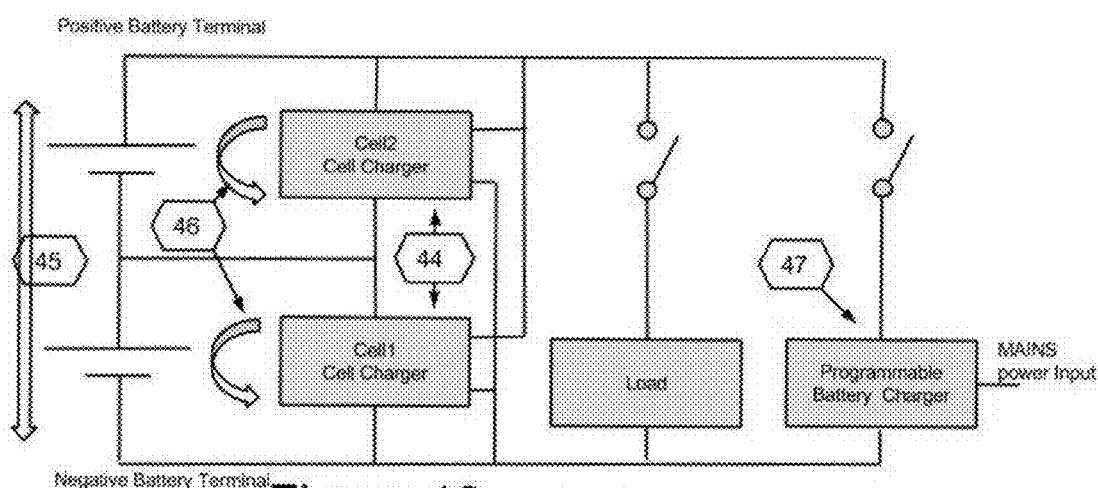
Figure 13. Hybrid Management System

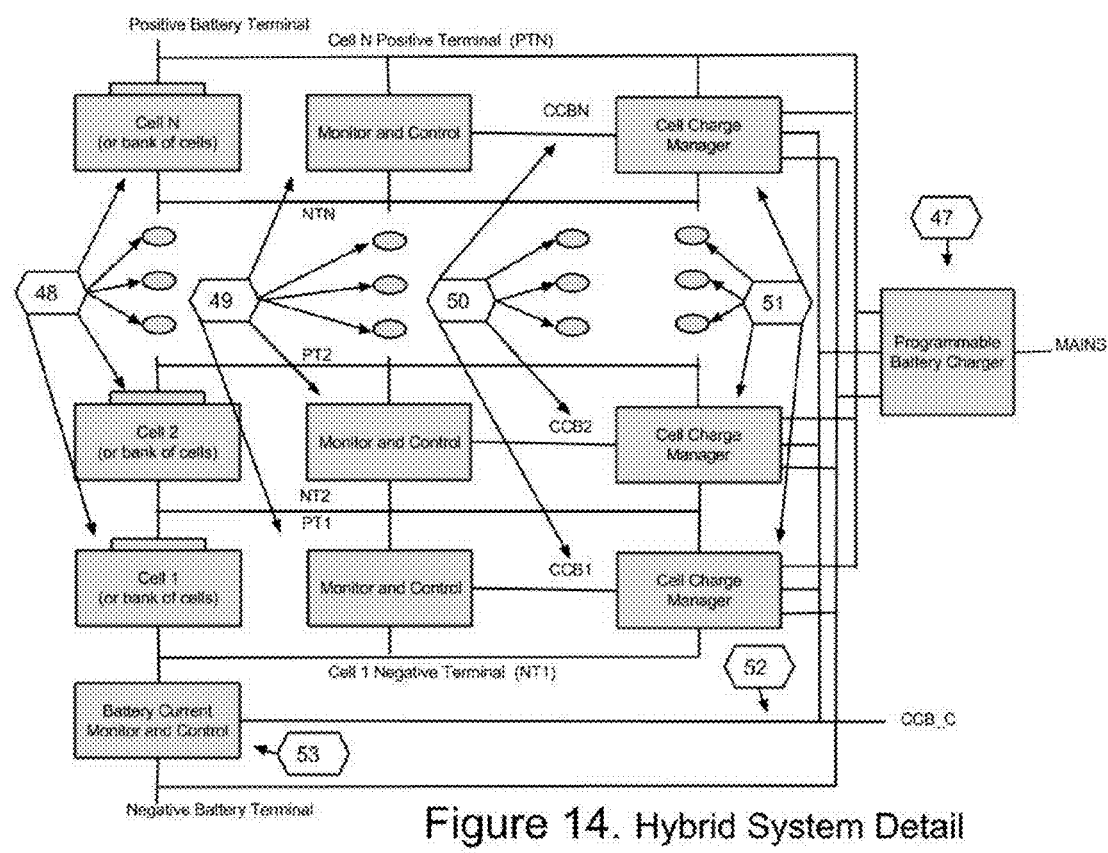
Figure 14. Hybrid System Detail

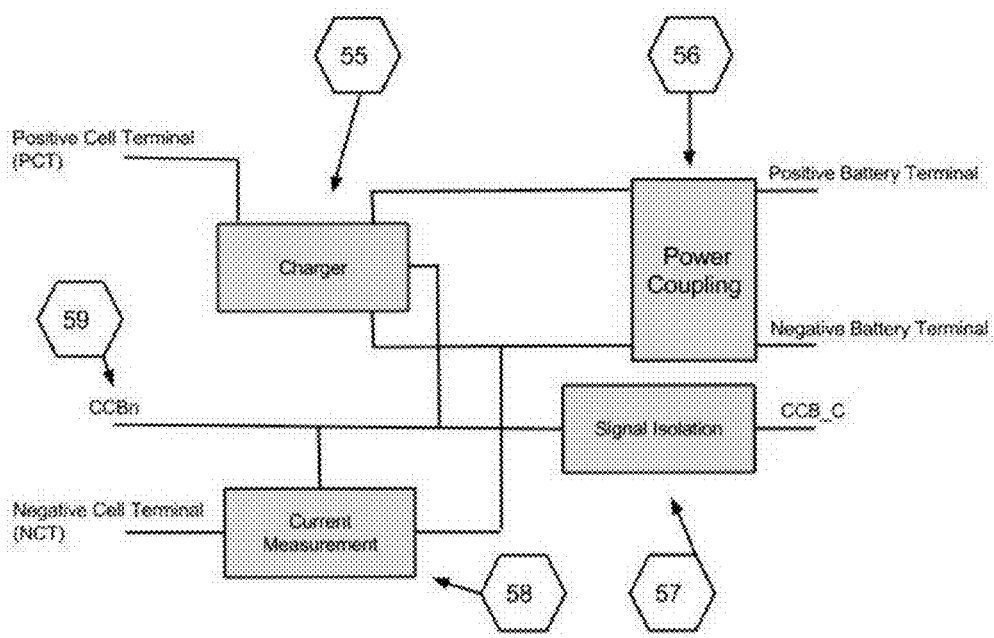
Figure 15. Cell Charge Manager

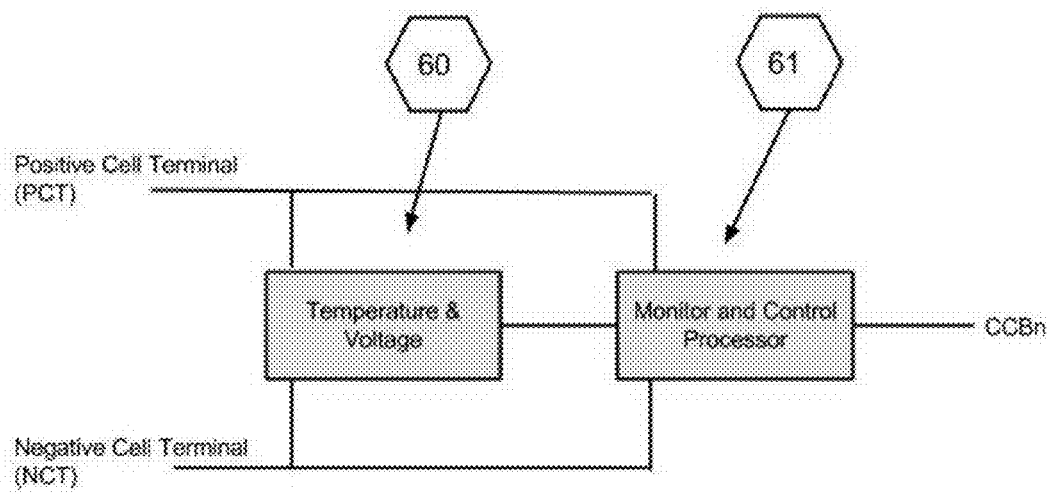
Figure 16. Monitor and Control

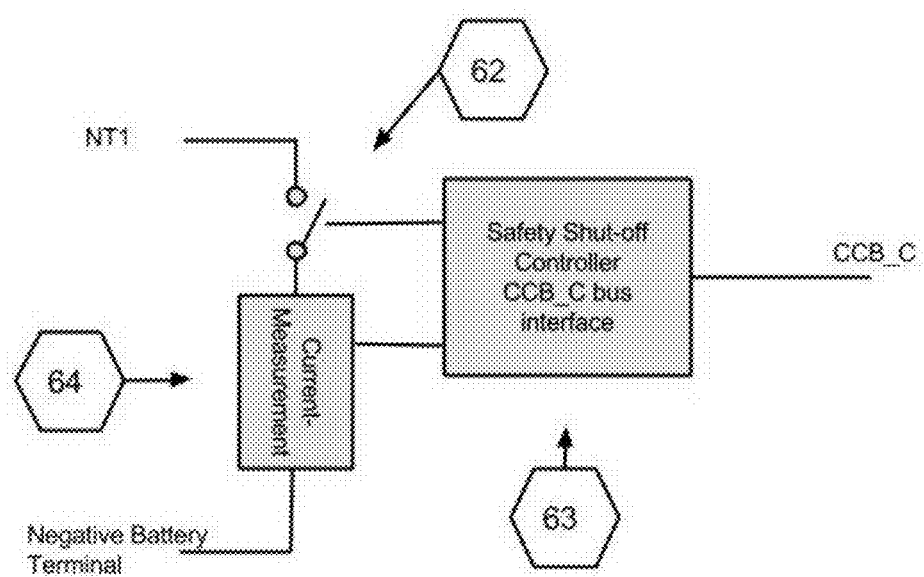
Figure 17. Battery Current Monitor and Control

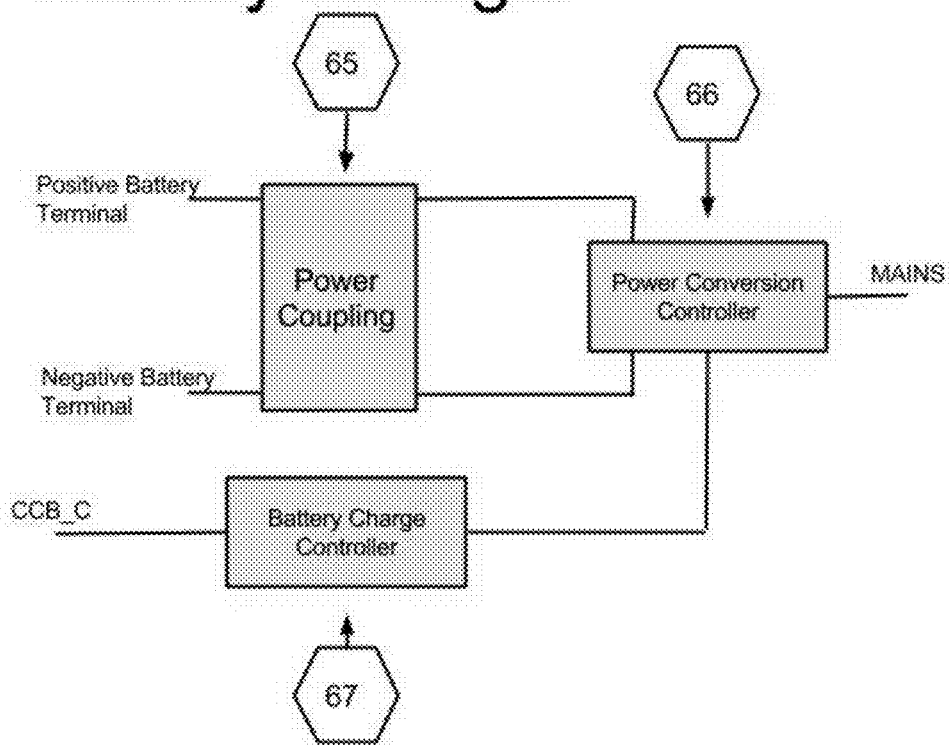

BATTERY CELL CHARGE MANAGEMENT SYSTEM AND METHOD

CROSS-REFERENCE TO RELATED APPLICATIONS

This application claims the benefit of provisional patent application Ser. No 62/037,382 filed 2014 Aug. 14 by the present inventor.

FEDERALLY SPONSORED RESEARCH

Not Applicable

SEQUENCE LISTING OR PROGRAM

Not Applicable

BACKGROUND

Field

This application relates to balance and equalization of rechargeable electrical energy cells constructed into a battery of a plurality of series connected cells.

A system and method for the charge control and cell charge redistribution for a plurality of series connected rechargeable electrical storage cells where the objective of equalization of individual cell is based on the optimization criteria of remaining coulombmetric capacity.

Prior Art

Batteries consisting of series connected cells of varying energy delivery capabilities create a challenging problem for cell charge management of both energy replenishment and depletion. In the discussion that follows a system for the optimization of charge storage and delivery for a battery, composed of a series of cells, based on individual cell charge and redistribution management is disclosed.

Historically rechargeable batteries, consisting of series and parallel connected electro-chemical cells, have been charged through a port common to both charge and discharge as shown in FIG. 1. This arrangement is simple, efficient and effective for many battery technologies and applications. Battery chemistries such as Lead-Acid and Ni—Cd are tolerant of over charge, the condition where cells are charged beyond the full charge state, and over discharge, the condition where cells are depleted below a recoverable threshold. Though robust, these technologies are at a disadvantage regarding both gravimetric and volumetric energy densities to Lithium based cells. Li-Ion cells in particular are intolerant of over and under charge. In the case of over charge, any cell voltage within the battery must be prohibited from exceeding a prescribed voltage limit in order to avoid explosion and/or fire while over discharge below a prescribed voltage need be avoided less a permanent loss of energy capacity will ensue. Therefore, per the configuration of FIG. 1, a Li-Ion battery consisting of a series connected cells is full when any of the constituent cells (1,2) is full, at which point charging (4) must cease. Alternatively, the battery is empty when any of the cells (1,2) is empty, at which point the load (3) must be removed to avoid damage to the battery.

The discharge characteristics of individual Li-Ion cells are shown in FIG. 2. The cells within a battery become imbalanced in remaining coulombmetric capacity to empty (abbreviated as RCCE) due to a number of factors including manufacturing variations and thermal gradients within the battery. The cell 5 of FIG. 2 has a coulombmetric capacity of 80% of that of cell 6.

In this illustration the full to empty energy storage capacity of cells 5 and 6 are 2.96 and 3.7 W Hrs respectively (6.66 W Hrs total). When these two cells are combined in series within a battery, both in a full charge state, the energy available is 6.00 W Hrs with a 0.66 W Hrs residual in cell 6 unavailable to the load due to cell 5 reaching the over discharge state. Specifically the current that flows from one cell is the same that which flows through the other (where charge is the integration of current over time). Alternatively if both cells were charged from mutual depletion to the point where cell 5 is full their combined energy available would be 5.85 W Hrs.

A simplified static load model for a cell is shown in FIG. 3. The cell (7) may be modeled by a voltage source (9) which represents the Open Circuit Voltage (abbreviated as OCV) in series with the internal impedance R (8). R (8) varies as much as 15% within the same manufacturing lot and is dependent on cell temperature, state of charge (coulombmetric % full, abbreviated as SOC) and time at rest. Variations in R are on the order of 50-100% as a function of SOC in the SOC range of 100-15%. FIG. 4 shows the impact on terminal voltage of the internal impedance as a function of load where the same cell is discharged at a rate of rated capacity (abbreviated as C) divided by 40 in (10) while curve (11) is discharged at a rate of C.

Traditionally charging of a depleted cell is a two step process, shown in FIG. 5, beginning with a constant current phase (12) followed by a constant voltage phase (13). A rapid charge from empty to the constant current/voltage transition (14), latter referred to as the 'Knee', yields 65 to 75% of the cells coulombmetric capacity in as little 40 minutes while the remaining constant voltage charge to full will typically take twice or more this amount of time to complete. Full charge determination is specified by the manufacturer to achieve rated capacity but is typically chosen by the system designer to be the condition where the charge current falls below a threshold, such as C/30, following the charge Knee (14). Note the power consumed in the charge process, denoted by Relative Power on the graph, drops significantly at constant/voltage transition (14). As a reference the last 30% of remaining coulombmetric capacity to full (abbreviated as RCCF) during charge equates to approximately 32% of the total energy storage for the cell while the last 30% in discharge to empty represents 27%.

It should be noted that the properties of charge and discharge prohibition limits apply to various other rechargeable electrical energy storage, including super-capacitors, and therefore all descriptions are equally valid and equivalent with regards to these technologies.

Prior art describes systems to equalize cell voltages and SOCs. Given the variation in electrical resistance as a function of SOC and the intrinsic difference in coulombmetric capacity of series connected cells, equal voltage or SOC of the constituent cells does not equate to equality in remaining coulombmetric capacity except at depletion or full. In these systems battery charge must be continuously moved from cell to cell to achieve voltage or SOC equality. Also note that SOC is a relative measurement of capacity where a specific reduction in SOC of one cell may not equate to an equal reduction of SOC in another series connected cell. Referring to FIG. 2, if cell 5 and 6 are paired and equalized at 3.7 volts, half capacity point of cell 5, there exists a 12% coulombmetric capacity deficit between the two cells which need be closed by battery empty. In a constant power high-discharge application, such as an electric vehicle or power tool, the voltage cell balancer competes with the load for the maximum discharge current which is problematic in that as the battery voltage declines the current demand increases. The advantage of the described system and method is that once RCCE equality during discharge or RCCF equality during charge is achieved no additional redistribution is required to achieve the stated goals.

A note on practice and terminology; the system or systems described subsequently lend well to the modular design of battery packs. In this concept a block can be composed of series and parallel connection of cells configured and managed by the system in the manner described. The battery can be composed of series and parallel blocks configured and managed by the system described, and so on, until aggregated down a load and MAINS connection. Any reference using the term cell in this document has the same meaning as a reference to a plurality of parallel connected cells. RCCE, measured in Amp Hours or coulombs, is the amount of charge that would be extracted from a cell if discharged to the empty voltage threshold from the present level. RCCF, measured in Amp Hours or coulombs, is the amount of charge that would be required to bring a cell to a full charge state from the present charge level. The word charge, as a noun, is quantified in coulombs (the cell charge). Charge, as a verb, is the application of current quantified in Amps (charge the cell).

SUMMARY OF THE INVENTION

The Battery Cell Charge Management System and Method described includes a battery charge-from-MAINS process and a cell charge redistribution process both based on equalization, in each cell, of the remaining coulombmetric capacities of all. Coulombmetric balance allows the battery to completely deplete with no residual cell charge remaining and simultaneously charge all cells to full. The advantage over prior art is that once balance is achieved no further redistribution is required.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The Parallel Battery Cell Charge Management System described includes a cell charge-from-MAINS process and a cell charge redistribution process. The cell charge-from-MAINS process provides a parallel charge of series connected cells at varying rates in order to equalize the RCCF of all cells within the battery in anticipation of a full charge. This charging regime will continue, while a power source is available, until all cells are fully charged thereby maximize the batteries charge storage capability. Cell charge redistribution is an event which occurs between a donor cell and one or more receptor cells in order to equalize the RCCE of all cells in the battery. On the condition of equal cell RCCE, the battery can be discharged to depletion with no residual cell charge remaining and no requirement for further charge redistribution.

Figure 1:
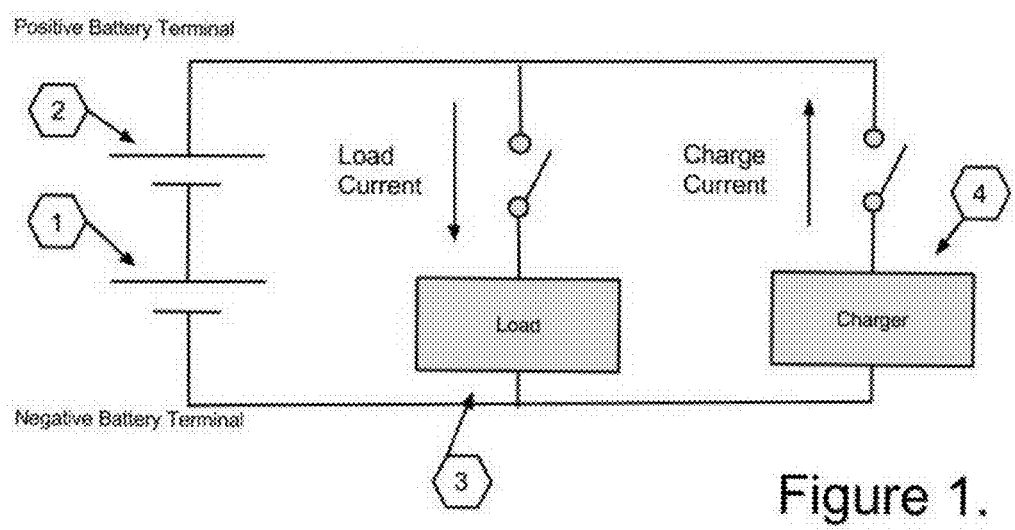
FIG. 1. Is an illustration of a two terminal battery system
FIG. 2. Is an illustration of the discharge characteristics for mismatched cells
FIG. 3. Is an illustration of a cell electrical model
FIG. 4. Is an illustration of a cell discharge voltage profile under various electrical loads.
Figure 2:
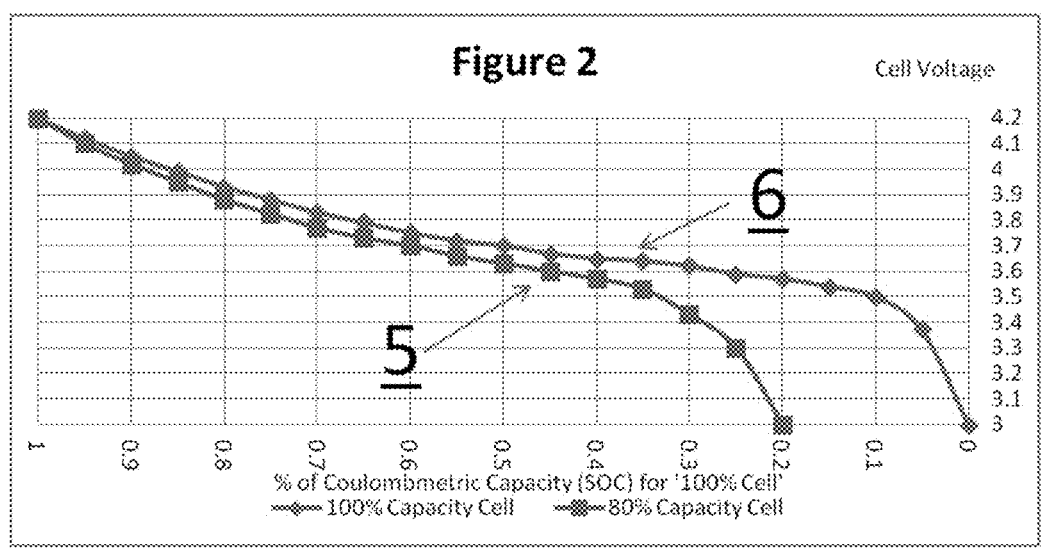
Figure 3:
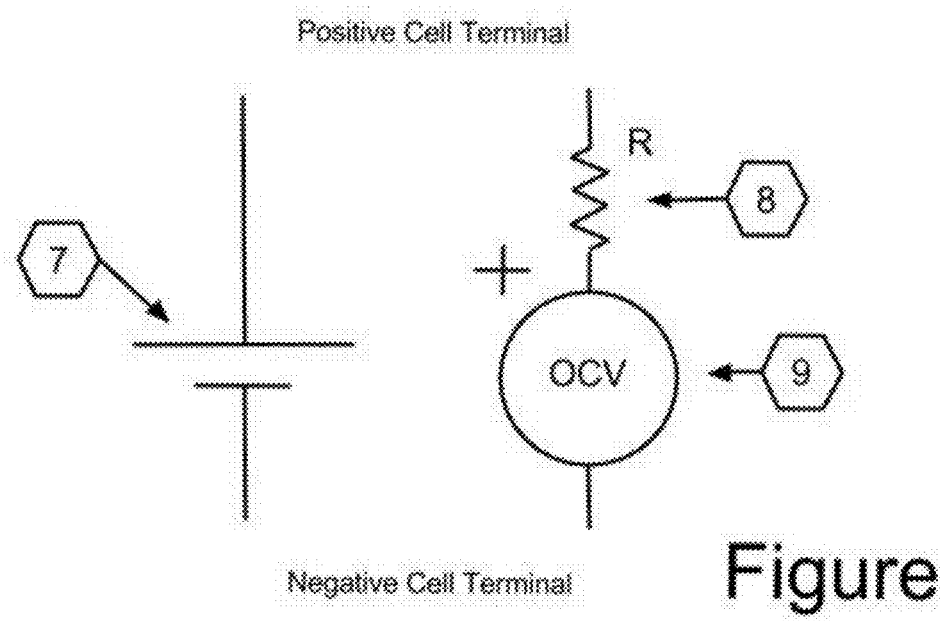
Figure 4:
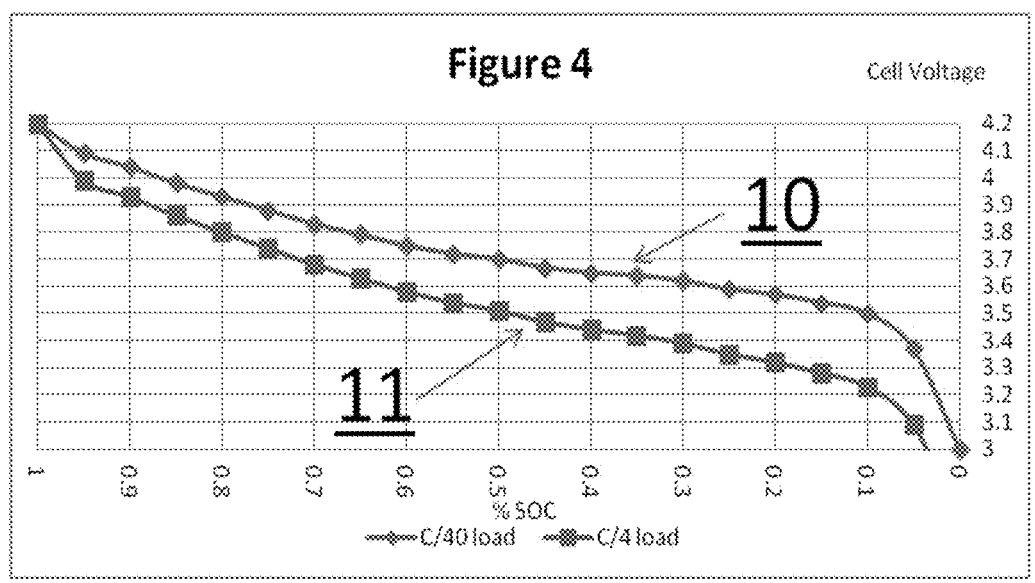
Figure 5:
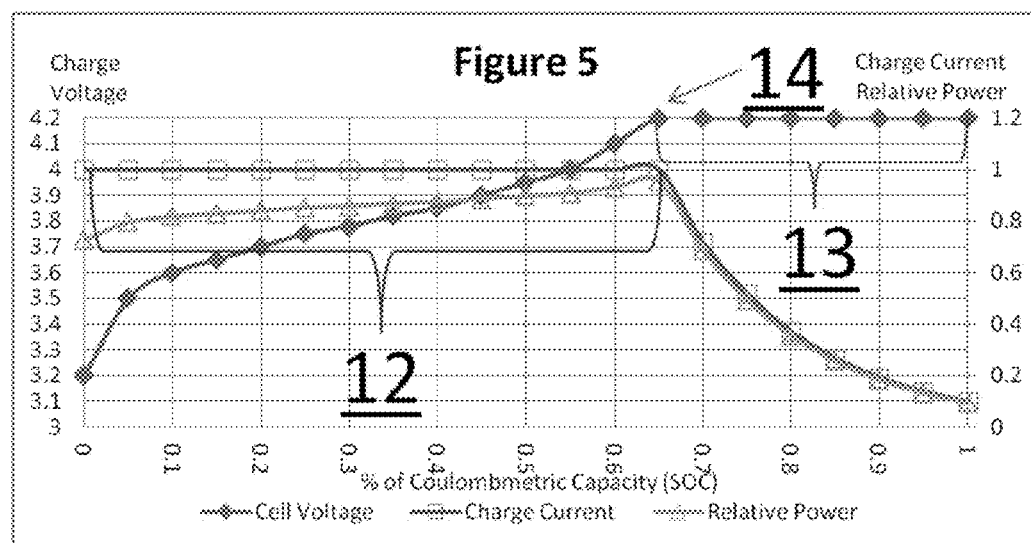
FIG. 5. Is an illustration of cell charge characteristics
FIG. 6. Is an illustration of parallel charge management system
FIG. 7. Is an illustration of the parallel system detail
FIG. 8. Is an illustration of a power manager
FIG. 9. Is an illustration of an alternative power bus
FIG. 10. Is an illustration of a monitor and control function
FIG. 11. Is an illustration of a battery current monitor and control function
FIG. 12. Is an illustration of a charger power supply
FIG. 13. Is an illustration of a hybrid management system
FIG. 14. Is an illustration of the hybrid system detail
FIG. 15. Is an illustration of a hybrid cell charge manager
FIG. 16. Is an illustration of hybrid monitor and control function
FIG. 17. Is an illustration of hybrid battery current monitor and control function
FIG. 18. Is an illustration of a hybrid programmable battery charger
Figure 6:
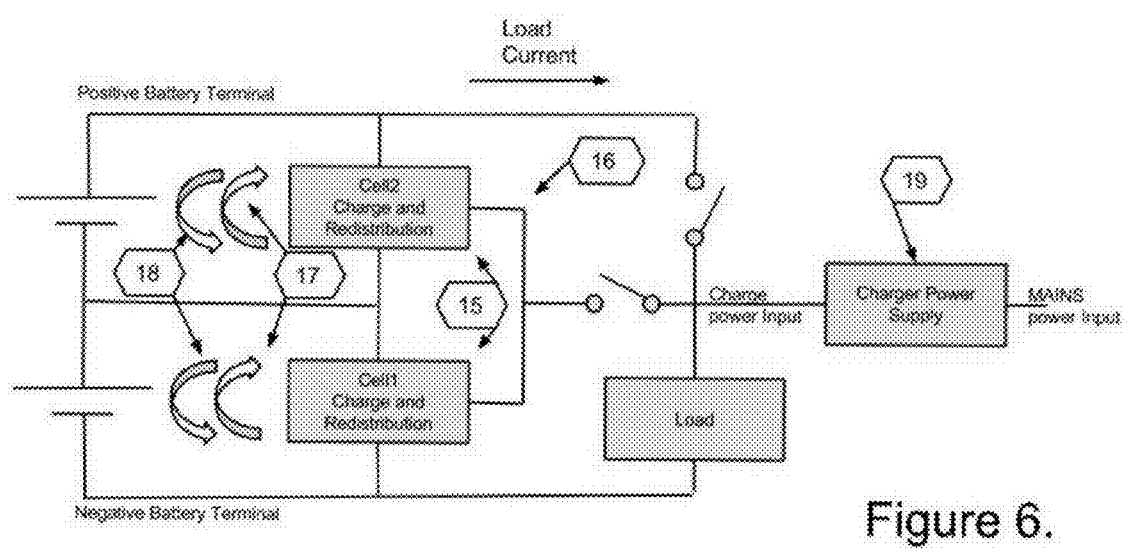

The Parallel Cell Charge Management System in FIG. 6 may be used to optimize charge delivery in a Li-Ion battery by making available all the stored charge for load consumption during discharge and to fill all cells to full capacity at charge completion. During discharge the cells RCCE is equalized by moving charge from the cells with the greatest RCCE to those with the least RCCE. During charge-from-MAINS each cell is prioritized to receive a charge, up to the maximum rate and power available, with the objective of equalizing RCCF in all. In order to set cell charge redistribution and charge-from-MAINS priorities each cell must be monitored so as to estimate RCCE and RCCF. The RCCE and RCCF estimation process will utilize voltage, temperature, current, accumulated current, cell impedance, cell empty and full criteria and the recorded history of these parameters. RCCE and RCCF estimation means are discussed in references R6 and R7. The Charge and Redistribution blocks (15) attached to each cell in FIG. 6 will assess if charge need be removed (17) or added (18) to individual cells based on the RCCE status during discharge and RCCF during charge. Power flows from cell to cell or from the Charger Power Supply (abbreviated as CPS) (19) to the cells through a shared Power Bus (abbreviated as PB) (16). An alternative to the shared PB (16) for both charge-from-MAINS and cell charge redistribution would be to bring the charge-from-MAINS power separately into each of the Power Manager blocks (23), shown in FIG. 7, while PB (16) would be dedicated for cell charge redistribution. Note the phrase charge-from-MAINS references charging using a power source which is external to the battery such as utility power or a power generator as opposed to charging from cell to cell.

Figure 7:
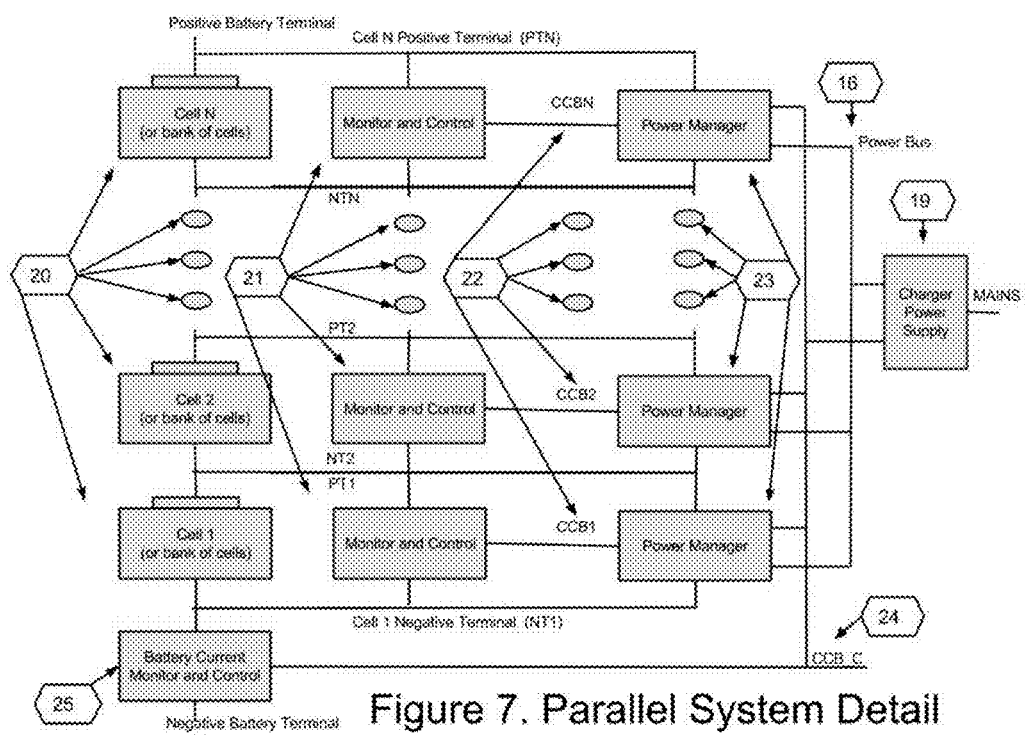

Details regarding the system of FIG. 6 are refined in FIG. 7. The cells (20), configured in series and extended to the general case with a count of N, are presented to the load through terminals Positive Battery Terminal and Negative Battery Terminal. Monitor and Control blocks (21) and Power Manager blocks (abbreviated as PM) (23), connect to each cell. The Monitor and Control blocks (21), PM blocks (23) and Battery Current Monitor and Control block (25), as well as the CPS (19) are connected by a signal and control bus which provides a communications and control channel between blocks and the load. In FIG. 7 this bus, identified as CCB_C (24) and CCB1 through CCBN (22), connect multiple masters using a data interface and protocol such as CAN or ETHERNET and may provide dedicated signaling lines for clock synchronization, CPS (19) control and status and a global PM (23) and CPS (19) disable signal for battery safety.

Figure 8:
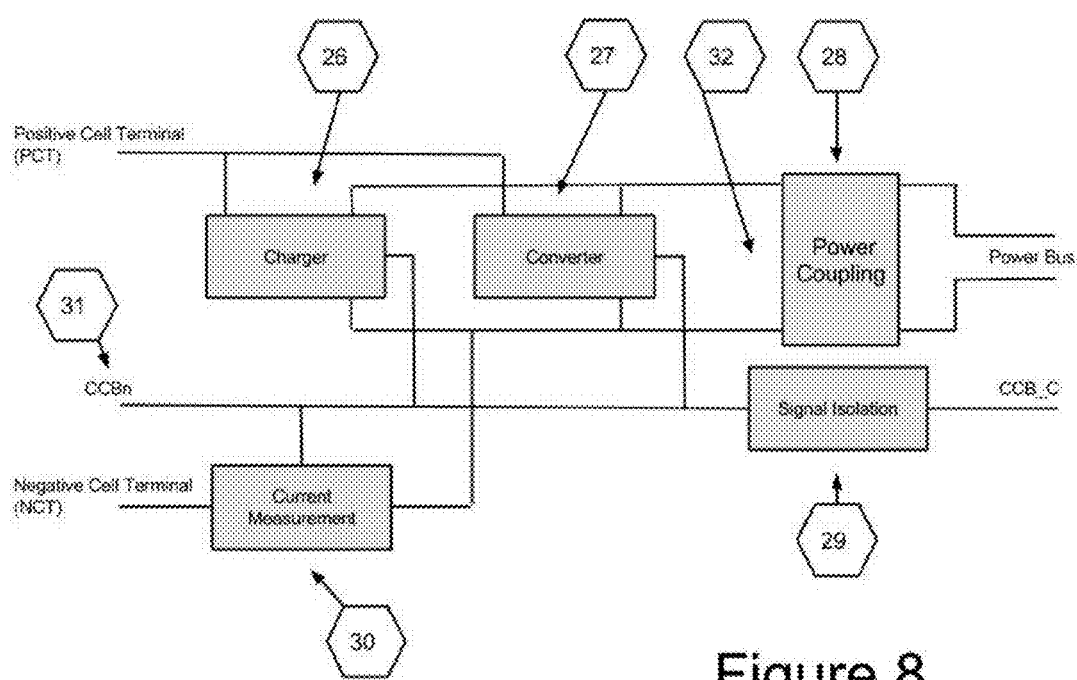

The PM block (23) is composed of the Charger block (26), Converter block (27), Power Coupling (28), Signal Isolation block (29) and the Current Measurement block (30) as shown in FIG. 8. The Signal Isolation block (29) provides data path electrical isolation for the cell connected blocks (21,23). Signal isolation is desired due to the wide range of voltages present within the system and may be accomplished through optocoupler, capacitor or data transformer. The CCB_C signaling and control bus (24) may be referenced to the Negative Battery Terminal, which is considered as the battery ground, and is accessible to the load for status and control. CCBn (22,31), where CCB1 designates the isolated bus for cell 1 and CCBN for cell N, is utilized within the cell referenced environment of the Monitor and Control (21) and PM (23) blocks where the local ground reference is the Negative Cell Terminal of the associated cell. The designation CCB will be used to refer generically to CCB_C (24) and/or CCBn (31). The Charger block (26) is a programmable battery charger which is voltage and current compliance configurable and controlled through CCBn (31). This block, in conjunction with the Power Coupling (28), which provides electrical isolation between the PM (23) and PB (16), is the conduit for all power delivered to the cell from the PB (16). The Converter block (27) is a current limit programmable power converter designed to move power from the cell to the PB (16) for the purpose of redistribution of charge to other cells. The Charger (26) and Converter (27) blocks may be synchronized on CCB in order to aid in the simplification of the power supply design. Cell current and integrated current supplied by the Charger (26) or removed by the Converter (27) blocks are measured within the Current Measurement block (30). The resulting measured data, accessed through CCBn (31), is used to control the power conversion function of the Charger (26) and Converter (27) blocks as well as being used in the calculation of RCCE and RCCF for the corresponding cell.

Figure 9:
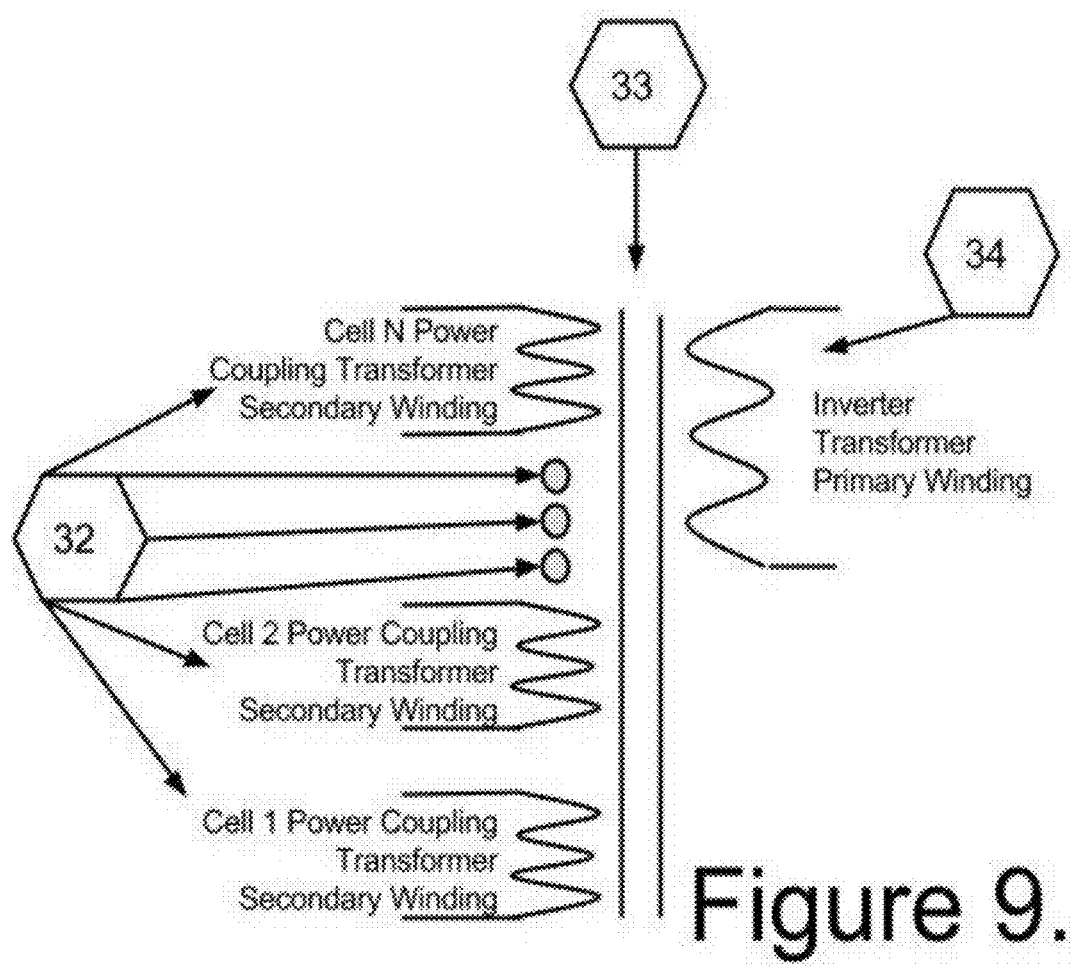

The PB (16) is a means to distribute power within the system. One implementation would use the output of an AC inverter (see CPS FIG. 12) tied to this bus to provide charge-from-MAINS power to the system. In this implementation the Power Couplings (28) and (40) would become power coupling transformers. An alternative PB (16) architecture is depicted in FIG. 9. In this configuration the individual power coupling transformers described above are replaced with a single transformer (33) with the wired Power Bus now constituted by the magnetic coupling within this single transformer. Another alternative PB (16) architecture involves the substitution of a bi-directional DC-to-DC converter for the Power Coupling (28) and an AC-to-DC or DC-to-DC converter to replace the Power Coupling (40) shown in FIG. 12.

Figure 10:
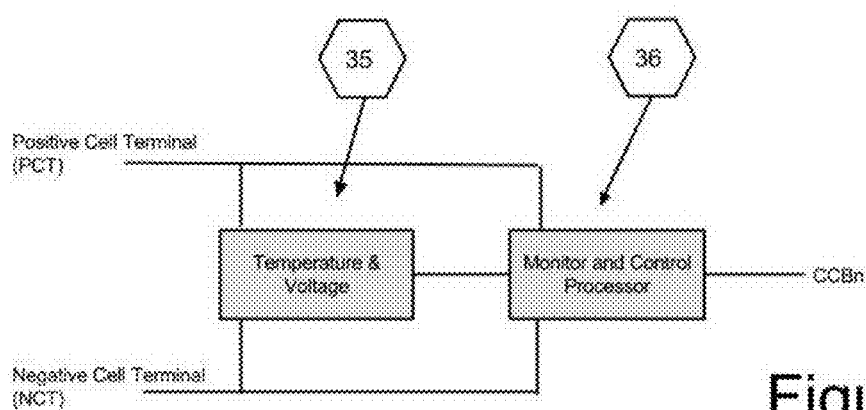

The Monitor and Control blocks (21) are responsible for the management of the power resources within the system, cell safety and the calculation of RCCE and RCCF. FIG. 10 depicts a Monitor and Control block (21) broken into a Temperature & Voltage measurement block (35) and a Monitor and Control Processor block (36). The Monitor and Control Processor block (abbreviated as MCP) (36) acquires cell temperature and voltage measurement data from the Temperature & Voltage block (35), cell current and accumulated current measurement data from the Current Measurement block (30) of FIG. 8 and battery current and accumulated current measurement data from the Current Measurement block (39) of FIG. 11 in order to estimate RCCE and RCCF. Additionally cell current and voltage are used by the MCP (36), along with the RCCE and RCCF status of the all cells, to control the Charger (26) and Converter (27) blocks of FIG. 8. This control is exercised through CCB by the programming of voltage and current compliance parameters into the Charger (26) and Converter (27) blocks. The cell connected blocks (21,23) of MCP (36), Temperature & Voltage (35), Charger (26), Converter (27) and Current Measurement (30) may be integrated on a single device making the choice of shared interface means between these blocks arbitrary as long as MCP (36) has an electrically isolated, multi-master, communications channel on signaling and control bus CCB. The MCP (36) is an applications microprocessor which assesses the RCCE and RCCF of its attached cell and controls the associated PM (23) for charge-from-MAINS and cell charge redistribution activities. These processors (21,36) continuously pole each other to determine the RCCE and RCCF status of their constituent cells. Data tables are maintained in each MCP (21,36) of the present state of RCCE and RCCF for all cells and voltage as a function of charge and discharge current and of temperature in histogram, measured coulombmetric capacity as a function of voltage and temperature in histogram for their attached cell. The MCPs (21,36) continuously communicate amongst themselves for RCCE and RCCF status and negotiate priority for both the redistribution of charge between cells and during charge-from-MAINS. On alert from the CPS (19) of the presence of MAINS power, all MCPs (21,36) will abandon cell charge redistribution activities and the MCP (36) controlling the cell with the largest RCCF will signal the CPS (19) to deliver a prescribed amount of charge power to the PB (16). As a note, one MCP (21,36) will always be designated as having the largest RCCE cell and one will be designated as the largest RCCF regardless of an actual equality between cells. In an alternative to that just described, the MCP function would be implemented as a single controller such as SSC (38), discussed subsequently, rather than a plurality of processors as described above and would exercise the monitor and control functions of individual cells through CCB.

Figure 11:
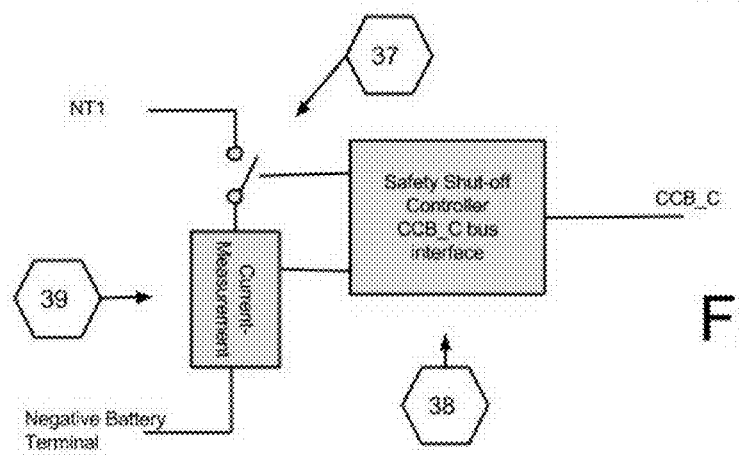

The Battery Current Monitor and Control block (25) is broken down in FIG. 11. The shut-off switch (37) is used to disconnect the battery from the load in the event that any of the cells reach the discharge limit, any of the cells or battery as a whole exceed a safe operating condition or is commanded off or on through CCB by the load. The Current Measurement block (39) measures battery current and accumulated current with measured data accessible through CCB. The Safety Shut-off Controller/CCB_C bus interface block (abbreviated as SSC) (38) contains an applications processor which is responsible for battery safety. This device monitors the system status with the ability of interrupting battery charge and discharge processes as well as the ability of resetting any or all MPUs to a known state if a safety issue or operation protocol violation occurs.

Figure 12:
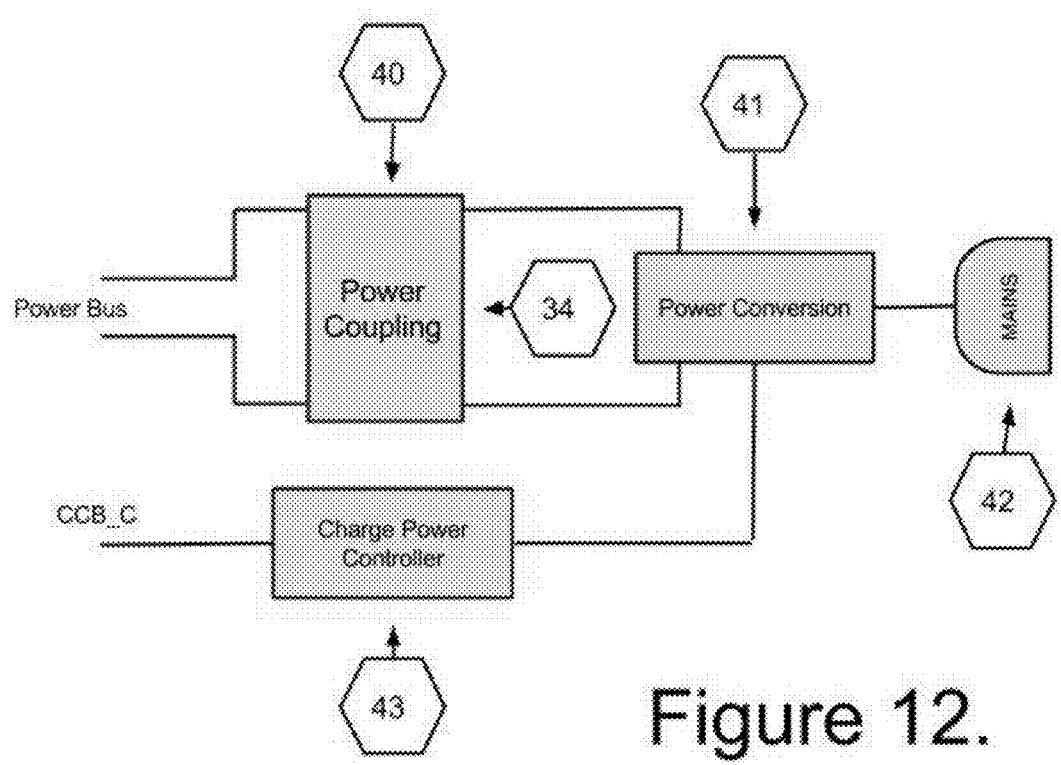

The CPS (19), as depicted in FIG. 12, is the power conduit from MAINS to the PB (16) for charge-from-MAINS system operation. The Power Conversion block (41) may be synchronized by CCB to simplify power supply design. The Charge Power Controller block (43) will inform the MCPs (21,36) and SSC (38) of the presence of available MAINS power and on command will apply the prescribed amount of power to PB (16). The Charge Power Controller block (43)

may be interrogated by the MCPs (21,36) or SSC block (38) as to the CPSs (19) capabilities and the system will adapt accordingly. The combination of Power Coupling (40) and Power Conversion (41) blocks may constitute an electrically isolated AC-to-AC, AC-to-DC, DC-to-AC or DC-to-DC power converter depending on MAINS power delivery and the PM (23) architecture. Note that the CPS function is referenced to MAINS (42) and therefore the CCB data path may be electrically isolated within the Charge Power Controller block (43) to isolate the battery ground from MAINS. The Charge Power Controller block (43) may have the ability to adapt the capability of the CPS (19) by determining the power capabilities of MAINS through plug signaling such as SAE-J1772. Alternatively if a NEMA 14-50 plug-cable assembly is attached, for example, the Charge Power Controller block (43) may contain a port which identifies that MAINS is 240 Volts capable of supplying 40 Amps if the plug-cable assembly is so equipped. This signaling may as simple as placing a specific resistor identifier within the plug-cable assembly.

Due to the shared nature of the PB (16), only one source of power may drive this bus while multiple Chargers (23,26) are permitted to be operational. During a cell charge redistribution operation the MCP (36) with the largest RCCE (donor) will calculate the cell charge rate required by each Charge and Redistribution block (15), under the constraint of maximum cell charge rate and voltage, PM (23) limitation and load demand, to achieve RCCE balance in as short a time as possible and communicate these rates to the other receptor MCPs (21,36) accordingly. Following negotiation, the donor Converter (27) is programmed by the associated MCP (36) to transmit a prescribed power or current on to the PB (16). The level of donor power or current delivery will be consistent with the maximum cell discharge rate given the load requirements of the system at the time. The cell charge redistribution or charge-from-MANS activities regarding RCCE and RCCF equalization may be dictated by a hysteresis level of up to 2% of rated C in order to reduce loss associated with the power conversion process. The receptor Charger (26) or Chargers (23,26) are programmed by their associated MCP (36) or MCPs (21,36) to collectively charge their respective cells at a rate consistent with the rate supplied by the donor. The first objective of the charge-from-MANS process is to utilize as much power as the CPS (19) can provide to safely charge the battery while attempting to equalized RCCF in each cell. During charge-from-MAINS, PB (16) is driven by the CPS (19). The charge-from-MAINS process, similar to redistribution, is a negotiation between MCPs (21,36) to achieve the stated charge objective. In this process the MCP (36) with the largest RCCF will calculate the cell charge rate required by each PM (23), under the constraint of maximum charge rate of the cell, Charger (26) limitation and CPS (19) capabilities, to achieve RCCF balance simultaneously in all cells in the shortest amount of time and communicate these rates to the other MCPs (21,36) and CPS (19) accordingly. Consistent with the stated objective of charge-from-MAINS, as the cells reach the charge Knee (14), at which point the charge current requirements tapper, charge current is reallocated to other cells in the battery when appropriate.

An alternate optimization of the above described charge-from-MAINS method would prioritize cell charging on the cells with the least RCCF in order to maximize charge power utilization. This regime would be used when the full battery energy to maximum charger power output is greater than one and has the advantage of maximizing power input by avoiding the significant power requirement taper that would occur when multiple cells simultaneously reach the Knee (14). In this regime individual cells are brought into the Knee (14) as quickly as possible in anticipation of a partial battery charge event. As cells enter constant voltage charge (13) the charge power requirements decline allowing power reallocation to cells which have not reached the Knee (14). A disadvantage of this regime is that the battery may require substantial cell charge redistribution subsequent to a partial charge as well as the possibly accelerated decline in the state of health for weak cells.

The Hybrid Battery Cell Charge Management System described includes a battery charge-from-MAINS process and a cell charge redistribution process. The cell charge-from-MAINS process provides both a series and a parallel charge of series connected cells at varying rates in order to equalize the RCCF of all cells within the battery in anticipation of a full charge. This charging regime will continue, while a power source is available, until all cells are fully charged thereby maximize the batteries charge storage capability. Cell charge redistribution is an event which occurs between the battery and one or more receptor cells in order to equalize the RCCE of all cells in the battery. On the condition of equal cell RCCE, the battery can be discharged to depletion with no residual cell charge remaining and no requirement for further charge redistribution.

The Hybrid Cell Charge Management System in FIG. 13 may be used to optimize charge delivery in a Li-Ion battery by making available all the stored charge for load consumption during discharge and to fill all cells to full capacity at charge completion. This approach uses individual Cell Chargers (44) to equalize cell remaining coulombmetric capacities during both charge-from-MAINS and discharge through load operations. During discharge the cells RCCE is equalized by moving charge from the battery to those cells with the least RCCE through the Cell Chargers (44). During charge-from-MAINS battery charge is applied to the series connection of cells by the Programmable Battery Charger (abbreviated as PBC) (47). During this process some of the PBC (47) charge current may be diverted to particular cells with the objective of equalizing RCCF in all cells and ultimately achieving a full charge of all cells in the battery. The charge-from-MAINS process requires that the PBC (47) and Cell Chargers (44) control the series battery current (45) such that the individual cells comply with the constant voltage profile (13) following the Knee (14) in that no cell voltage exceeds the constant voltage charge limit. This is accomplished by adjusting both the cell and battery charge rates through the Cell Chargers (44), which are individually programmable, and the PBC (47). The stated objective is to allocate charge recourses such as to equalize RCCF in order to maximize charge resource utilization. In order to set redistribution and charge-from-MAINS charge priorities each cell must be monitored so as to estimate RCCE and RCCF. The RCCE and RCCF estimation process will utilize voltage, temperature, current, accumulated current, cell impedance, cell empty and full criteria and the recorded history of these parameters. RCCE and RCCF estimation means are discussed in references R6 and R7. The Cell Charger blocks (44) attached to each cell in FIG. 13 will assess if charge need be added (46) to individual cells based on the RCCE status during discharge or RCCF status during charge.

Details regarding the system of FIG. 13 are refined in FIG. 14. The cells (48), configured in series and extended to the general case with a count of N, are presented to the load, PBC (47) and Cell Charge Manager blocks (51) through terminals Positive Battery Terminal and Negative Battery Terminal. Monitor and Control blocks (49) and Cell Charge Manager blocks (51) connect to each cell. The Monitor and Control blocks (49), Cell Charge Manager blocks (51) and Battery Current Monitor and Control block (53), as well as the PBC block (47) are connected by a signal and control bus which provides a communications and control channel between blocks and the load. In FIG. 14 this bus, identified as CCB_C (52) and CCB1 through CCBN (50), connect multiple masters using a data interface and protocol such as CAN or ETHERNET and may provide dedicated signaling lines for clock synchronization, PBC (47) control and status and a global Cell Charge Manager (51) and PBC (47) disable signal for battery safety.

The Cell Charge Manager block (abbreviated as CM) (51) is composed of the Charger block (55), Power Coupling (56), Signal Isolation block (57) and the Current Measurement block (58) as shown in FIG. 15. The Signal Isolation block (57) provides data path electrical isolation for the cell connected blocks (49,51). The CCB_C signaling and control bus (52) may be referenced to the Negative Battery Terminal, which is considered as the battery ground, and is accessible to the load for status and control. CCBn (50,59), where CCB1 designates the isolated bus for cell 1 and CCBN for cell N, is utilized within the cell referenced environment of the Monitor and Control (49) and CM (51) blocks where the local ground reference is the Negative Cell Terminal of the associated cell. The designation CCB will be used to refer generically to CCB_C (52) and/or CCBn (50,59). The Charger block (55) is a programmable battery charger which is voltage and current compliance configurable and controlled through CCBn (59). It is further defined that the combination of Charger block (55) and Power Coupling block (56) constitute an electrically isolated DC-to-battery charger function. The CM (51) is the conduit for cell charge redistribution delivered to the cell from the battery terminals. The Charger block (55) may be synchronized on CCB in order to aid in the simplification of the power supply design. Cell current and integrated current supplied by the Charger block (55) to the cell is measured by the Current Measurement block (58). The resulting measured data, accessed through CCBn (59), is used to control the power conversion function of the Charger block (55) as well as being used in the calculation of RCCE and RCCF for the corresponding cell.

The Monitor and Control blocks (49) are responsible for the management of the power resources within the system, cell safety and the calculation of RCCE and RCCF. FIG. 16 depicts a Monitor and Control block (49) broken into a Temperature & Voltage measurement block (60) and a Monitor and Control Processor block (61). The Monitor and Control Processor block (abbreviated as MCP) (61) acquires cell temperature and voltage measurement data from the Temperature & Voltage block (60), cell current and accumulated current measurement data from the Current Measurement block (58) of FIG. 15 and battery current and accumulated current measurement data from the Current Measurement block (64) of FIG. 17 in order to estimate RCCE and RCCF. Additionally cell current and voltage are used by the MCP (61), along with the RCCE and RCCF status of the all cells, to control the Charger block (55) and PBC (47). This control is exercised through CCB by the programming of voltage and current compliance parameters into the Charger block (55) and PBC (47). The cell connected blocks (49,51) of MCP (61), Temperature & Voltage (60), Charger (55), and Current Measurement (58) may be integrated on a single device making the choice of shared interface means between these blocks arbitrary as long as MCP (61) has an electrically isolated, multi-master, communications channel on signaling and control bus CCB. The MCP (61) is an applications microprocessor which assesses the RCCE and RCCF of its attached cell and controls the associated CM (51) for charge-from-MAINS and cell charge redistribution activities. These processors (49,61) continuously pole each other to determine the RCCE and RCCF status of their constituent cells. Data tables are maintained in each MCP (49,61) of the present state of RCCE and RCCF for all cells and voltage as a function of charge and discharge current and of temperature in histogram, measured coulombmetric capacity as a function of voltage and temperature in histogram for their attached cell. The MCPs (49,61) continuously communicate amongst themselves for RCCE and RCCF status and negotiate priority for both the redistribution of charge between cells and during charge-from-MAINS. On alert from the PBC (47) of the presence of MAINS power, all MCPs (49,61) will abandon cell charge redistribution activities and the MCP (61) controlling the cell with the largest RCCF will signal the PBC (47) to deliver a prescribed charge rate to the battery terminals. As a note, one MCP (49,61) will always be designated as having the lowest RCCE cell and one will be designated as the largest RCCF regardless of an actual equality between cells. In an alternative to that just described, the MCP function would be implemented as a single controller such as SSC (63), discussed subsequently, rather than a plurality of processors as described above and would exercise the monitor and control functions of individual cells through CCB.

The Battery Current Monitor and Control block (53) is broken down in FIG. 17. The shut-off switch (62) is used to disconnect the battery from the load or PBC (47) in the event that any of the cells reach the discharge limit, any of the cells or battery as a whole exceed a safe operating condition or is commanded off or on through CCB by the load. The Current Measurement block (64) measures battery current and accumulated current with measured data accessible through CCB. The Safety Shut-off Controller/CCB_C bus interface block (abbreviated as SSC) (63) contains an applications processor which is responsible for battery safety. This device monitors the system status with the ability of interrupting battery charge and discharge processes as well as the ability of resetting any or all MPUs to a known state if a safety issue or operation protocol violation occurs.

The PBC (47), as depicted in FIG. 18, is the power conduit from MAINS to the battery terminals for charge-from-MAINS system operation. The PBC (47), constituted by Power Coupling (65), Power Conversion Controller (66) and Battery Charge Controller (67), is a programmable electrically isolated MANS-to-battery charger. The Power Conversion Controller block (66) may be synchronized by CCB to simplify power supply design. The Battery Charge Controller block (67) will inform the MCPs (49,61) and SSC (63) of the presence of available MAINS power and on command will apply the prescribed charge rate to the battery terminals. The Battery Charge Controller block (67) may be interrogated by the MCPs (49,61) or SSC block (63) as to the PBCs (47) capabilities and the system will adapt accordingly. Note that the PBC function is referenced to MAINS and therefore the CCB data path may be electrically isolated within the Battery Charge Controller block (67) to isolate the battery ground from MAINS. The Battery Charge Controller block (67) may have the ability to adapt the capability of the PBC (47) by determining the power capabilities of MAINS through plug signaling such as SAE-J1772. During a cell charge redistribution operation the MCPs (49,61) will negotiate a level of charge transfer from the battery to one or more lesser RCCE receptor cells. The MCP (49) with the lowest RCCE will calculate the cell charge rate required by all Cell Charger blocks (44), under the constraint of maximum cell charge rate and voltage, Charger (55) limitation and load demand, to achieve RCCE balance simultaneously in all cells in the shortest amount of time and communicate these rates to the other MCPs (49,61) accordingly. The level of battery current delivery will be consistent with the maximum battery discharge rate given the load requirements of the system at the time. The cell charge redistribution or charge-from-MAINS activities regarding RCCE and RCCF equalization may be dictated by a hysteresis level of up to 2% of rated C in order to reduce loss associated with the power conversion process. The first objective of the charge-from-MAINS process is to utilize as much power as the PBC (47) can provide to safely charge the battery while attempting to equalized RCCF in each cell. The charge-from-MAINS process, similar to redistribution, is a negotiation between MCPs (49,61) to achieve the stated charge objective. In this process the MCP (61) with the largest RCCF will calculate the cell charge rate required by all Cell Charger blocks (44), under the constraint of maximum charge rate of the cell, Charger (55) limitation and PBC (47) capabilities, to achieve RCCF balance simultaneously in all cells in the shortest amount of time and communicate these rates to the other MCPs (49,61) and PBC (47) accordingly. Consistent with the stated objective of charge-from-MAINS, as the cells reach the charge Knee (14), at which point the charge current requirements tapper, charge current is reallocated to other cells in the battery, when appropriate, and accordingly the PBC (47) may be adjusted to insure a that the charge voltage constraint is not violated.

An alternate charge-from-MAINS regime would use the parameter remaining coulombmetric capacity to the Knee (RCCK), which is the amount of charge that would be required to bring a cell to the charge Knee from the present charge level, instead of RCCF. This optimization would be well suited for applications where there is no advantage in diverting charge when the first Knee is reached due sufficient power resources to charge all cells at the maximum rate.

I claim:

1. A method of equalizing cell charge of a battery consisting of a plurality of series connected cells, such method comprising the steps of: (a) determination that said battery is not being charged from an external source (b) estimating the remaining coulombmetric capacity to empty for each cell (c) redistribution of cell charge to equalize said remaining coulombmetric capacity to empty and (d) termination of said equalization when all cells are substantially equal with regards to said remaining coulombmetric capacity to empty Whereby said cells of said battery will reach a depleted state at substantially the same time allowing for the full utilization of available battery capacity.

2. A method of equalizing cell charge of a battery consisting of a plurality of series connected cells, such method comprising the steps of: (a) determination that said battery is being charged from an external source (b) estimating the remaining coulombmetric capacity to full for each cell (c) redistribution of cell charge to equalize said remaining coulombmetric capacity to full and (d) termination of said equalization when all cells are substantially equal with regards to said remaining coulombmetric capacity to full Whereby said cells of said battery will reach a fully charged state at substantially the same time allowing for the full utilization of available charger capability.

* * * * *